(12) United States Patent
Wald et al.

(10) Patent No.: US 11,531,193 B2
(45) Date of Patent: Dec. 20, 2022

(54) OPTICAL ARRANGEMENT, MULTI-SPOT SCANNING MICROSCOPE AND METHOD FOR OPERATING A MICROSCOPE

(71) Applicant: Carl Zeiss Microscopy GmbH, Jena (DE)

(72) Inventors: Matthias Wald, Jena (DE); Tierno Anhut, Jena (DE); Daniel Schwedt, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 855 days.

(21) Appl. No.: 16/344,164

(22) PCT Filed: Oct. 25, 2017

(86) PCT No.: PCT/EP2017/077245
§ 371 (c)(1),
(2) Date: Apr. 23, 2019

(87) PCT Pub. No.: WO2018/077920
PCT Pub. Date: May 3, 2018

(65) Prior Publication Data
US 2019/0331903 A1    Oct. 31, 2019

(30) Foreign Application Priority Data
Oct. 25, 2016   (DE) .......................... 102016120308.4

(51) Int. Cl.
*G01J 3/02*    (2006.01)
*G02B 21/00*   (2006.01)
(Continued)

(52) U.S. Cl.
CPC ........ *G02B 21/0076* (2013.01); *G01J 3/0202* (2013.01); *G01J 3/0208* (2013.01);
(Continued)

(58) Field of Classification Search
CPC ............ G02B 21/0076; G02B 21/0064; G02B 21/04; G02B 21/004; G01J 3/0202;
(Continued)

(56) References Cited

U.S. PATENT DOCUMENTS 6,483,103 B2   11/2002   Engelhardt et al.
7,898,656 B2   3/2011    Yun et al.
(Continued)

FOREIGN PATENT DOCUMENTS

CN   101281061 A   10/2008
CN   102221741 A   10/2011
(Continued)

OTHER PUBLICATIONS

Yang, Jing and Yi Han, Chinese Application No. 201780066241.8, Notice of Grant, dated Aug. 9, 2021, 2 pages (English translation provided).
(Continued)

*Primary Examiner* — Abdullahi Nur
(74) *Attorney, Agent, or Firm* — LaBatt, LLC (57) ABSTRACT

The invention relates to an optical arrangement, particularly for the detection beam path of a multi-spot scanning microscope, comprising a detection plane, in which a detector is positionable, comprising a dispersive device for spectrally splitting detection light. According to the invention, the optical arrangement is characterized in that a distorting optical unit is present for guiding the detection light into the detection plane, said distorting optical unit being arranged downstream of the dispersive device and upstream of a detection plane, and in that a rotating device is present for the relative rotation of a luminous field of the spectrally separated detection light and the distorting optical unit. The invention additionally relates to a multi-spot scanning microscope and a method for operating a microscope.

21 Claims, 8 Drawing Sheets

(51) Int. Cl.
　　　*G01J 3/18* (2006.01)
　　　*G02B 21/04* (2006.01)
　　　*G01J 3/12* (2006.01)

(52) U.S. Cl.
　　　CPC ............ *G01J 3/18* (2013.01); *G02B 21/0064* (2013.01); *G02B 21/04* (2013.01); *G01J 2003/1208* (2013.01)

(58) Field of Classification Search
　　　CPC .... G01J 3/0208; G01J 3/18; G01J 2003/1208; G01J 2003/069; G01J 3/0205; G01J 3/28; G01J 3/02; G01J 3/14
　　　See application file for complete search history.

(56) References Cited

U.S. PATENT DOCUMENTS

| | | | |
|---|---|---|---|
| 2005/0012927 | A1 | 1/2005 | Seyfried et al. |
| 2006/0169873 | A1 | 8/2006 | Seyfried et al. |
| 2006/0192971 | A1* | 8/2006 | Carver ............... G01J 3/02 356/455 |
| 2009/0273777 | A1 | 11/2009 | Yun et al. |
| 2011/0249155 | A1 | 10/2011 | Hiraide |
| 2012/0193511 | A1 | 8/2012 | Okabe et al. |
| 2013/0182306 | A1 | 7/2013 | Anhut et al. |
| 2015/0253556 | A1 | 9/2015 | Schwedt et al. |
| 2015/0268097 | A1* | 9/2015 | Ishimaru ............ G01J 3/0291 356/456 |
| 2017/0199362 | A1 | 7/2017 | Schwedt et al. |
| 2017/0350763 | A1 | 12/2017 | Shafer et al. |

FOREIGN PATENT DOCUMENTS

| | | |
|---|---|---|
| DE | 19842288 A1 | 2/2000 |
| DE | 10006800 A1 | 8/2001 |
| DE | 10332193 A1 | 2/2005 |
| DE | 102004003993 A1 | 3/2005 |
| DE | 102004034998 A1 | 2/2006 |
| DE | 102014107606 A1 | 12/2015 |
| DE | 102014116782 A1 | 5/2016 |
| DE | 102014119299 A1 | 6/2016 |
| DE | 102016119730 A1 | 4/2018 |
| EP | 1691180 A2 | 8/2006 |
| JP | H07128146 A | 5/1995 |
| JP | 2012159549 A | 8/2012 |
| JP | 2013539079 A | 10/2013 |
| WO | 20090134719 A2 | 5/2009 |
| WO | 2013086527 A1 | 6/2013 |

OTHER PUBLICATIONS

EP Application No. 17797083.7, CZMA-P011-EP, Search Report, dated Mar. 14, 2022, 5 pages (no English translation).

International Preliminary Report on Patentability for Application No. PCT/EP2017/077245, dated May 9, 2019, 9 pages.

JP Application No. 2019-522217, Office Action, dated Oct. 5, 2021, 8 pages (English summary provided).

German Application No. DE201610120308 Oct. 25, 2016, Search Report and Written Opinion(English Translation not Available), dated May 22, 2017, 12 pages.

Yang, Jing and Yi Han, Chinese Application No. 201780066241.8, Office Action, dated Feb. 20, 2021, 20 pages (english translation provided).

International Search Report and Written Opinion for International Application No. PCT/EP2017/077245 (No English Translation available), dated Apr. 6, 2018, 10 pages.

JP Application No. 2019-522217, Decision to Grant a Patent, dated Mar. 18, 2022, received Jun. 30, 2022, 5 pages (Machine translation provided).

\* cited by examiner

OPTICAL ARRANGEMENT, MULTI-SPOT SCANNING MICROSCOPE AND METHOD FOR OPERATING A MICROSCOPE

In a first aspect, the present invention relates to an optical arrangement, in particular for the detection beam path of a multi-spot scanning microscope, in accordance with the preamble of claim 1. In addition, the invention relates to a multi-spot scanning microscope and to a method for operating a microscope.

A generic optical arrangement for the detection beam path of a multi-spot scanning microscope has a detection plane, in which a detector is positionable, and a dispersive device for spectrally separating detection light. Such arrangements are known in spectrally resolving multi-spot scanning microscopes.

In some applications in laser scanning microscopy, the light emitted by a sample is to be detected in a spectrally resolved fashion. The prior art in this respect is extensive. For example, DE 10 2014 116 782 A1 describes a system that makes possible spectrally resolved detection of the light that is reflected back by an illuminated sample location. DE 198 42 288 A1 describes this principle, which is also used in laser scanning microscopes. The dispersion that is necessary for spectrally resolved detection can here be generated using a prism or a grating.

In further variants, spectral lines are selected in a spectral line plane, for example using mirrors, and then guided onto what are known as Airyscan detectors. In addition, there is now the object of capturing spectral color components which are not reflected back (which may also be the entire spectrum if the mirrors are removed entirely from the beam path). Since currently only line sensors are suitable for confocal microscopy as highly sensitive sensors having a plurality of pixels, the object is that of imaging the information from the sample onto said line sensor in the smartest way possible. Due to the multi-spot excitation, in which excitation light is incident on or in a plurality of focal regions on or in a sample to be examined, the information is coming from said plurality of different locations on or in the sample. The information is typically of the type such that the focal points, which in this description are also simply being referred to as spots, are arranged in series in a coordinate direction, and, in an axis that is perpendicular thereto, the spectrum which is in each case associated with the focal point is fanned out in a spatial direction.

It may be considered to be an object of the invention to provide an optical arrangement, a multi-spot scanning microscope, and a method for operating a microscope, in which a particularly variable utilization of a detector is made possible.

This object is achieved by way of the optical arrangement having the features of claim 1, of the multi-spot scanning microscope having the features of claim 19, and of the method for operating a microscope having the features of claim 20.

The optical arrangement of the aforementioned type is developed in accordance with the invention such that, for guiding the detection light into the detection plane, a distortion optical unit is present which is arranged, in the beam direction, downstream of the dispersive device and upstream of a detection plane, and that a rotation device is present for a relative rotation of a luminous field of the spectrally separated detection light and the distortion optical unit.

A multi-spot scanning microscope according to the invention includes the following components: a microscope optical unit, an illumination beam path, a detection beam path, a scanner, a light source for providing excitation light in the illumination beam path, an optical arrangement according to the invention in the detection beam path, a detector, in particular a line detector, that is positioned in the detection plane of the optical arrangement according to the invention, wherein the detector plane of the optical arrangement is optically conjugate to a sample plane, and a control unit for actuating the optical arrangement, in particular the rotation device of the optical arrangement, and the light source and for at least preliminarily processing measurement data provided by the detector.

In a method according to the invention for operating a microscope according to the invention, the rotation device is used to seta rotation position of the luminous field relative to the distortion optical unit in dependence on a number of illumination spots.

Advantageous developments of the optical arrangement according to the invention and of the microscope according to the invention and useful variants of the method according to the invention will be described in the following description, in particular with reference to the dependent claims and the figures.

The term optical arrangements in the context of this description will refer to groups of optical and mechanical components which together perform a specific optical function. The optical and mechanical components can be formed as one assembly or be accommodated in a common housing.

The term detection beam path is understood to mean the distance traveled by the light that is reflected back by an examined sample from the sample to a detection device, for example a camera. This in particular also refers to the individual beam-guiding and beam-manipulating components, such as mirrors, lenses, prisms and gratings.

The term multi-spot scanning microscope refers to a microscope in which a sample that is to be examined is scanned simultaneously with a plurality of focal points, also referred to as focal spots or just spots.

The term detection plane in the context of this description refers to the plane in which a detector, such as a camera chip, is arranged. The detection plane is typically located in a plane that is optically conjugate to the sample plane, that is to say in an intermediate image plane.

The term dispersive devices refers to components with which a spectral spatial separation of a beam of light is possible. Spectral spatial separation or, in equivalent terms, dispersive separation in the context of this description refers in particular to situations in which different spectral components of a beam are guided into different spatial directions and are separated in this sense. Here, in determined, non-vanishing wavelength intervals and spatial direction intervals, continuous imaging of one wavelength to one spatial direction is effected. That means that wavelengths that are located close to one another are guided into spatial directions that are also close to one another. Wavelengths which are further apart from one another are correspondingly guided into spatial directions which are further apart from one another.

The term distortion optical unit for the purposes of the present invention is understood to mean an optical unit that deviates from a rotationally symmetric optical unit, as is provided for example by spherical lenses.

In principle, any optical unit that, upon corresponding relative rotation, distorts the image field such that the spatial or spectral degrees of freedom to be measured come to lie for example on one sensor line can be used as the distortion optical unit.

This technical effect can be accomplished for example if the distortion optical unit includes at least one refractive and/or reflective anamorphic optical unit.

Particularly preferred are embodiment variants of the invention, in which the distortion optical unit is a cylindrical optical unit. For example, one or more cylindrical mirrors can be used for the cylindrical optical unit. With particular advantage, cylindrical lenses can be used in addition or alternatively.

However, in principle, fixed refractive optical units, such as phase masks, and/or adjustable refractive optical units, for example spatial light modulators (SLMs), can also be used as the distortion optical unit for imparting the required phase function on the luminous field.

The term cylindrical optical unit designates an optical component or a plurality of optical components which have focusing properties that differ in different spatial directions. In particular, the term cylindrical optical unit refers to an optical unit in which no focusing whatsoever occurs in one coordinate direction, specifically along a specific axis, which is also referred to as the axis of this cylindrical optical unit.

To describe relative arrangements of components in the beam path, the terms upstream and downstream, in the beam direction, are used. For example, this means for the detection beam path that a second component, which is located downstream of a first component, is located closer to the detector than the first component, which is located upstream of the second component.

The term luminous field is significant for the present invention. It refers to the geometric-spatial distribution of the intensity of the electromagnetic radiation. For example, after a white light beam has passed through a diffractive grating, which consists of a plurality of bars, a spectrally spread-out luminous field is formed, which extends in a plane that is perpendicular to the direction of extent of the grating bars.

A rotation device in the context of the present invention is understood to mean technical means that make it possible to rotate a luminous field relative to other components in space.

Relative rotation here means that only the relative rotation position is important, which means that initially and in principle it is as yet undecided which of the two components that have been placed in a relation with respect to one another is to be actively rotated with respect to the environment and which component is static relative to the environment.

The term microscope optical unit in the context of the present description is understood to mean all optical components that are typically present in the beam path of a microscope, in particular a microscope objective.

The beam path taken by the excitation light from a light source to the sample is designated the illumination beam path. The optical components that manipulate, guide and shape the excitation light from the light source to the sample are together likewise referred to as the illumination beam path.

The term light, in particular illumination light, excitation light and detection light, is understood to mean electromagnetic radiation in wavelength ranges that are typically used or that typically occur in microscopy. The illumination light, which can in particular be in the infrared, visible or ultraviolet spectral range, is typically provided by lasers as the light sources. The microscope according to the invention is preferably a laser scanning microscope.

Since fluorescence microscopy is an essential microscopy technique, the light is also called excitation light, because said light typically excites the fluorescence of dyes with which a sample has been prepared.

Scanners that are used in a microscope according to the invention are components which are known in principle, such as galvanometric scanners.

For multi-spot scanning microscopy, multi-lens arrays are frequently used, which serve to provide a plurality of illumination spots, in particular a variable number of illumination spots.

The plane in which a sample is located and which is sharply imaged onto a detector is generally designated the sample plane. That means that the detector is located in a plane that is optically conjugate to this sample plane or, in other words, in an intermediate image plane.

As a control unit for the microscope according to the invention and for the optical arrangement according to the invention, electronic components may be used, in particular programmable ones, which are known in principle, such as PCs or microcontrollers.

In multi-spot scanning microscopy, a number of illumination spots with which a sample is scanned and concrete path courses for the scanning can be variably selected. In typical variants, up to four illumination spots are used, wherein these illumination spots scan a sample for example in immediately successive fashion. Alternatively, the various illumination spots can each scan different sample regions such that a desired region of the sample overall is completely scanned.

An essential concept of the present invention can be considered that of providing a device with which a luminous field having at least one spatially spread-out spectrum, but typically a plurality of spread-out spectra, is rotated initially appropriately relative to a distortion optical unit and of subsequently focusing the luminous field only in one direction using the distortion optical unit. In this way, assuming the rotation angles are suitably selected, the spatial-spectral information can be obtained and an available detector can be best utilized.

One important advantage of the optical arrangement according to the invention and of the microscope according to the invention can be considered the fact that it is possible with comparatively simple optical means to set the detection beam path to different operating modes of a multi-spot scanning microscope. Suitable operating modes for the spectrally resolving scanning microscopy are for example scanning with an illumination spot, with two illumination spots and with four illumination spots. For non-spectrally-resolving scanning microscopy, operating modes in which a sample is scanned with comparatively many illumination spots at the same time are also of interest. Since in the optical arrangement according to the invention only few optical components are used, light losses are low and only little installation space is required.

In principle it is possible to position in the detector plane further optical, for example light-guiding, components to guide the detection light to be detected to a detector. In particularly advantageous variants of the optical arrangement according to the invention, however, a detector is arranged in the detection plane.

This detector can be for example two-dimensional segmented detectors which are known in principle. Such detectors are used for example in Airyscan microscopy. However, a line detector can be particularly advantageous in the optical arrangement according to the invention, wherein in particular a longitudinal direction of the line detector is oriented parallel to an axis of the distortion optical unit. In the case of such positioning, it is possible to image onto the line detector the spectra, which are part of the detection light that has been transmitted back by the sample, for example from four different illumination spots, in mutually successive fashion using the distortion optical unit.

In particularly preferred variants of the optical arrangement according to the invention, the detector is a GaAsP detector, a photomultiplier, a SPAD array or a fast camera.

In DE 10 2014 107 606 A1, a two-dimensional detection matrix is used, wherein in one direction a measurement of different spatial channels is performed, while in the other direction the spectrum for the respective spatial channel is established. The spectrum is rotated, as is indicated in [0073] and by the double-headed arrow in FIG. 5 of DE 10 2014 107 606 A1, by rotating the dispersion element (prism). However, the luminous field in DE 10 2014 107 606 A1 is not, as in the exemplary embodiments of the present invention, rotated relative to the sensor about an axis that contains the optical axis of the luminous field and is substantially normal with respect to the sensor surface. Rather, DE 10 2014 107 606 A1 describes a translation of the spectrum to a two-dimensional sensor matrix, which is caused by the rotation of the dispersion prism. However, the central element of the present application is precisely the fact that a relative rotation of the luminous field with respect to the sensor arrangement, which of a for example anamorphic distortion optical unit, which is arranged fixedly on the frame relative to a line-shaped sensor, makes possible the efficient utilization of a one-dimensional, as it were vectorial, sensor for different measurement purposes. In a simple case, this is accomplished by way of an image-field-rotating prism (Dove prism or Abbe-Koenig prism). Such an element is not described in DE 10 2014 107 606 A1.

In DE 10 2014 107 606 A1, a two-dimensional matrix sensor is used, in which the spectra of the spots can in each case be simultaneously measured.

The purpose of the present invention is to be able to perform measurements, for example using a one-dimensional sensor, for example a line of detector elements, either spectrally or in a spatially resolving fashion, and consequently spectrally integrated per luminous spot.

In principle, it is important for the realization of the invention that in the optical arrangement the luminous field is rotated relative to the distortion optical unit. This rotation can be realized in one refinement of the invention in that the distortion optical unit is rotatable relative to the dispersive device with the rotation device. However, since it is also important for the distortion optical unit to have a constant relative position with respect to the detector, a detector that is positioned in the detection plane must be co-rotated with the distortion optical unit. In this case, the rotation device is substantially a mechanical rotation device which rotates the distortion optical unit and a detector which may be present relative to the dispersive device. The luminous field as such remains unchanged in space, for example relative to the dispersive device.

In particularly preferred variants of the invention, the distortion optical unit is fixed relative to the dispersive device. That means that, in particular between the dispersive device and the distortion optical unit, an optical rotation device for rotating the luminous spot is present. The mechanical complexity of this variant is comparatively lower.

Theoretically, variants in which both the distortion optical unit with the detector and the luminous field itself are rotated are also conceivable. What is essential is merely that a desired relative rotation position between the luminous field and the distortion optical unit is attained.

Spatial manipulation of the luminous field can be accomplished for example using rotatable mirrors. In advantageous variants of the optical arrangement according to the invention, the rotation device can therefore include at least one rotating mirror.

In the case of particularly preferred alternatives of the optical arrangement according to the invention, the rotation device includes at least one rotation prism. Rotation prisms are used to particularly elegantly and effectively enable rotation of a luminous field.

A rotation prism can in principle be positioned at any desired location of the beam path in the optical arrangement according to the invention between the distortion optical unit and the dispersive device. However, with particular preference, a rotation prism can be arranged at a location of the tightest constriction of the beam path, in particular, with respect to a beam path of a connected microscope, in a pupil plane. The result is the advantage that comparatively small rotation prisms can be used. These are not only more cost-effective than larger rotation prisms, but also require less installation space.

With particular preference, the rotation prism in an optical arrangement according to the invention can be an Abbe-Koenig prism or a Dove prism.

In particularly preferred variants of the optical arrangement according to the invention, an axis of the relative rotation between the distortion optical unit, for example the cylindrical optical unit, and the luminous field is oriented transversely, in particular perpendicularly, to an axis of the distortion optical unit.

The rotation axis of the relative rotation between luminous field and the distortion optical unit, and in particular the sensor, preferably contains the optical axis of the luminous field. With particular preference, the rotation axis of the relative rotation is transverse and in particular perpendicular or normal to a sensor surface.

For the dispersive device of the optical arrangement according to the invention, it is important that the desired spatial separation or spreading-out of the spectral components contained in the detection light be accomplished. Typically, in an optical arrangement according to the invention, a refractive and/or a diffractive component is present as the dispersive device.

For example, a prism can be present as a refractive component and/or a diffraction grating can be present as a diffractive component.

With respect to the distortion optical unit, it is functionally important that the desired focusing properties be attained in a coordinate direction such that a line detector is illuminated as optimally as possible in the transverse direction thereof, that is to say perpendicularly to the direction of extent of the line, and that, in addition, no focusing or only weak focusing be effected in the direction of the line. Particularly preferred are variants of the optical arrangement according to the invention in which the distortion optical unit is formed by a single cylindrical lens. By using only one cylindrical lens, transmission losses can be kept to a minimum.

The spatial dimensions of a luminous field of the detection light exiting a microscope optical unit are determined by the optical components present in the beam path of the microscope optical unit. These do not necessarily have to be consistent with the available detectors or the detectors that are used. Under these considerations, variants of the optical arrangement according to the invention in which a telescope optical unit with a first and a second lens is present for adapting an imaging scale, in particular to dimensions of a detector that is used, are advantageous. It can be useful here for the distortion optical unit and the rotation device, in particular the rotation prism, to be arranged between the first and the second lens of the telescope. Another advantage of such a telescope section is that further installation space and a further pupil plane are provided, which makes the positioning of a rotation prism for example easier.

Alternatively, a zoom optical unit can also be provided for adapting an imaging scale, in particular to dimensions of a detector that is used. This variant permits for example the adaptation of the beam path to different detectors having different geometric dimensions.

In particularly advantageous variants of the method according to the invention, the optical arrangement can be used, depending on the position of the rotation device, to image the spectrum of one illumination spot, the spectra of two illumination spots or the spectra of four illumination spots onto the detector. The variant in which the spectrum of a single illumination spot is imaged onto the detector corresponds, according to the method, to what is known as a single-spot scanner and is able to be realized as a special case also with the method according to the invention that is described here.

However, in principle it is also possible to image the light beams, which in each case originate from different illumination spots, onto the line detector such that the direction of extent of the light spectrum is perpendicular to the direction of extent of the line sensor. In one refinement, in which the distortion optical unit with the detector is fixed relative to the dispersive device and, in the non-rotated state of the luminous field, the spectrum of an illumination spot can be imaged onto the line detector, a rotation of the luminous field by 90° is necessary herefor. In the case of such positioning, the spectral resolution is completely lost, but the illumination light of particularly many illumination spots can be measured simultaneously, in each case in spectrally integrated fashion.

Consequently, the present invention provides an optical unit that makes possible a flexible arrangement of the available information on a line sensor. At the same time, the optical complexity can be kept very low. High transmission can be ensured and the technical outlay overall is low.

The above-stated object is thus achieved by way of the appropriate use of a distortion optical unit and of a rotation prism. A distortion optical unit is used to focus the light in one axis (x-axis in FIGS. 6 to 9), while the light in the other axis that is perpendicular thereto (y-axis in FIGS. 6 to 9) is not influenced. Additionally, a required imaging scale can be realized on the line sensor by way of a rotationally symmetric imaging optical unit. Alternatively, the cylindrical lens and the line sensor can also be rotated together, but this is technically relatively complicated because the typically cooled line sensor is relatively large.

If the cylindrical lens is fixed in space, the line-type illumination of the sensor is fixed independently of the rotation angle of the rotation prism, specifically in the orientation of the cylindrical lens axis. The effect of the rotation prism can be imagined to be one in which the field of the spectral line plane is rotated into the desired orientation before it is focused onto the line sensor using the distortion optical unit, in particular the cylindrical optical unit. To this end, any desired use of the line sensor can be possible in principle. The sensor is thus variably utilizable, depending on the task. Focusing here means fundamentally a concentration or guiding of the light energy onto the detector surface, that is to say the detector line, rather than focusing in the sense of optical imaging within the regime of a diffraction limit.

In principle, area scan detectors can also be used. In that case, the optical arrangement according to the invention can be used to reduce the required detector area to one line, and the remaining detector area can be used for other detection tasks, for example for other microscopy techniques which are performed at the same time.

Suitable detectors can also be fast cameras, SPADs and/or photomultipliers, for example multichannel plates. The illumination in a correspondingly configured microscope can in principle be effected in different ways. First, all excitation spots can have the same spectral composition. In a sample which is scanned with those multi-spots, all emission channels in this case contain similar spectral information, naturally dependent on the respectively illuminated location in the sample. It is furthermore also possible for the spectral content of the excitation spots to vary, which can be advantageous. In this case, a defined spectral emission, for example of a dye, with exactly this illumination spot can be attained in a targeted fashion. Next, the spectral content of the individual lines can differ (see FIG. 4). The spectral emission distribution can possibly also be influenced by mirrors and stops, as are described for example in German patent application no. 10 2016 119 730.0.

Further properties and advantages of the invention will be explained below with reference to the attached schematic figures. In the figures.

A first exemplary embodiment of an optical arrangement 100 according to the invention will be explained with reference to FIG. 1. Identical parts and components, and parts and components having an equivalent effect, are generally provided with the same reference signs in the figures.

Figure 1:
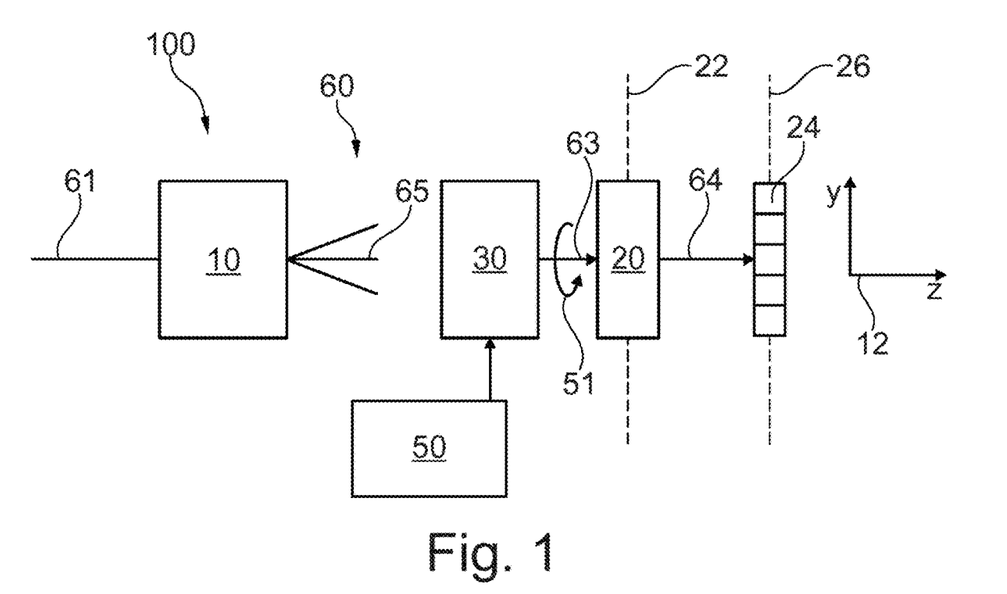
FIG. 1 shows a first exemplary embodiment of an optical arrangement according to the invention.

The optical arrangement 100 according to the invention, shown in FIG. 1, includes, as essential parts, a dispersive device 10, a rotation device 30 with actuation 50, a distortion optical unit 20, and a detection plane 26. In the example shown, the distortion optical unit is a cylindrical optical unit 20. A coordinate system 12 is to serve for describing the spatial directions. An axis 22 of the cylindrical optical unit 20 and a line detector 24 arranged in the detection plane 26 extend in the y-direction. The x-axis is perpendicular to the yz-plane.

A light beam 61 is incident, in the situation which is illustrated schematically in FIG. 1, on the dispersive device 10, which may be for example a diffraction grating. Said light beam 61 originates from an illumination spot in a sample (not illustrated in FIG. 1), which is located in a microscope (likewise not illustrated). The light beam 61 is spread out by the dispersive device 10 into a spectrum 65 in the y-direction, as is schematically shown in FIG. 1. Any spectra which may be present of further illumination spots are located at another x-position, i.e., in front of or behind the spectrum 65 with respect to the paper plane. The spectra which are associated with different illumination spots are thus located on top of one another or behind one another as viewed in the x-direction.

If the dispersive device 10 were a simple grating, the grating bars in FIG. 1 would extend perpendicularly to the paper plane in the x-direction. The spread-out spectra, in particular the spectrum 65, form or forms the luminous field 60, which is incident on the rotation device 30. The rotation device 30 can be for example a rotation prism which can be rotated by mechanical and electronic means, realized by the control unit 50. A rotated or twisted luminous field 63 exits the rotation device 30 and arrives at the cylindrical optical unit 20. An azimuthal rotation direction is here indicated by a rotation arrow 51. The rotation axis itself is parallel to the z-axis.

The cylindrical optical unit 20 focuses the incident luminous field 63 in the x-direction, that is to say perpendicularly to the paper plane of FIG. 1 and perpendicularly to the y-direction and z-direction (see coordinate system 12). By contrast, no focusing takes place in the y-direction due to the cylindrical optical unit 20, because the axis 22 thereof extends in the y-direction. The luminous field 64 which has been focused in this way is incident on the line detector 24. It is thus possible using the rotation device 30 to vary a relative rotation position of the luminous field 63 relative to the cylindrical optical unit 20. This makes possible variable imaging of the light spectra belonging to different illumination spots onto one and the same line detector 24. Further details in this respect will be explained in connection with FIGS. 4 to 15.

Figure 2:
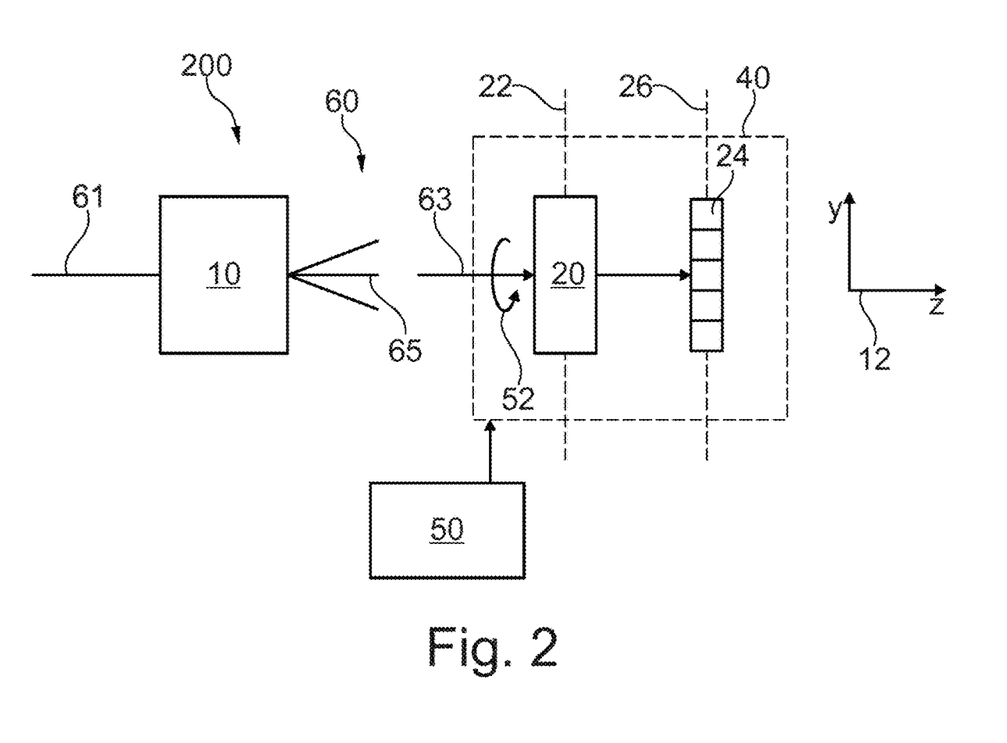
FIG. 2 shows a second exemplary embodiment of an optical arrangement according to the invention.

FIG. 2 illustrates a further exemplary embodiment of an optical arrangement 200 according to the invention, in which a variable rotation position of the luminous field 63 that is incident on the cylindrical optical unit 20 is achieved by way of the cylindrical optical unit 20 being rotated together with the line detector 24 relative to the dispersive device 10 with a rotation device 40. The luminous field 60 as such in this variant is spatially not manipulated, that is to say that the luminous field 60 exiting the dispersive device 10 is in principle identical to the luminous field 63 that is incident on the cylindrical optical unit 20. The azimuthal rotation direction of the cylindrical optical unit 20 is schematically illustrated in FIG. 2 by way of the arrow 52. The direction of the rotation axis itself is again parallel to the z-axis. The rotation device 40, which is actuated by a control unit 50, in the variant in FIG. 2 is substantially of a mechanical nature, because what is important here is to position the cylindrical optical unit 20 and the detector 24 relative to the dispersive device 10 with respect to the rotation position.

Figure 3:
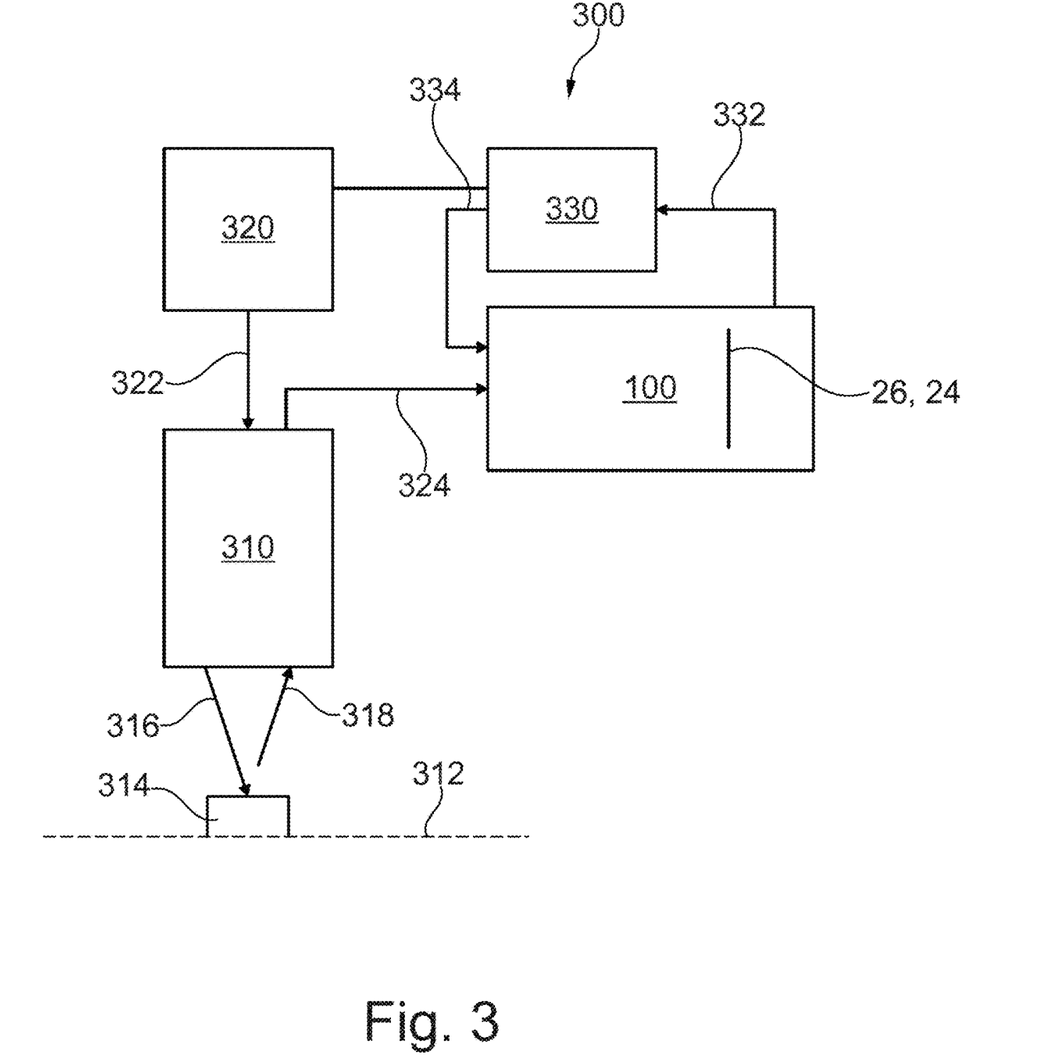
FIG. 3 shows an exemplary embodiment of a multi-spot scanning microscope according to the invention.

FIG. 3 schematically shows a microscope 300 according to the invention. Said microscope includes, as essential parts, a microscope optical unit 310, a light source unit 320, a sample plane 312 with a sample 314 to be examined, which is positioned there, an optical arrangement 100 according to the invention, and finally a control unit 330. Excitation light 322 that is emitted by the light source unit 320 passes into the microscope optical unit 310, including in particular a scanner and a microscope objective (not illustrated in FIG. 3), and is focused for example, as schematically illustrated by the arrow 316, to a plurality of illumination spots on the sample 314. For example, four illumination spots are scanned at the same time over the sample 314. The portions of the sample which are illuminated by the illumination spots transmit light 318 back, which is guided by the microscope optical unit 310. Detection light exiting the microscope optical unit 310 in the form of the luminous field 324 enters the optical arrangement 100 according to the invention and can here be detected, as described above in connection with FIG. 1, by a line detector 24 that is positioned in the detection plane 26. The optical arrangement 100 according to the invention can be actuated by a control unit 330, which is connected to the optical arrangement 100 via a schematically indicated operative connection 334. Measurement data 332 supplied by the detector 24 can, at least provisionally, be evaluated by the control unit 330, which may be for example a PC or a comparable calculation device. The control unit 330 can additionally serve for actuating the light source unit 320.

Figure 4:
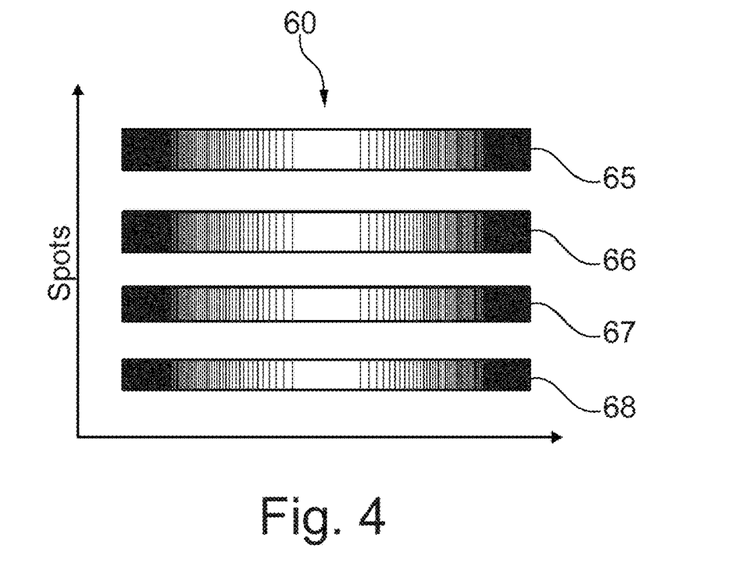
FIG. 4 shows a diagram for explaining properties of the detection field in spectrally resolving multi-spot scanning microscopy.

Fundamental properties of a luminous field 60 in multispot scanning microscopy, as they manifest after the detection light has passed through the dispersive device 10 of an optical arrangement according to the invention, will be explained in connection with FIG. 4. Here, a total of four spectra 65, 66, 67, 68 are illustrated schematically in a coordinate system, which each originate from different illumination spots on a sample. The horizontal coordinate axis in FIG. 4 corresponds to the y-axis in FIGS. 1 and 2. When all illumination spots are excited spectrally identically, the spectra 65, 66, 67, 68 will look comparatively similar, naturally depending on the sample composition at the respective location of the illumination spot. However, the excitation of the different illumination spots can already be spectrally different in principle. In that case, the spectra 65, 66, 67, 68 individually can also exhibit clear differences. The extent of the spectra 65, 66, 67, 68 in the direction of the horizontal axis in FIG. 4 and the distance of these spectra in the direction of the vertical axis in FIG. 4 is determined by the microscope optical unit 310 and the dispersive device 10 and possibly by further components present in the beam path.

Figure 5:
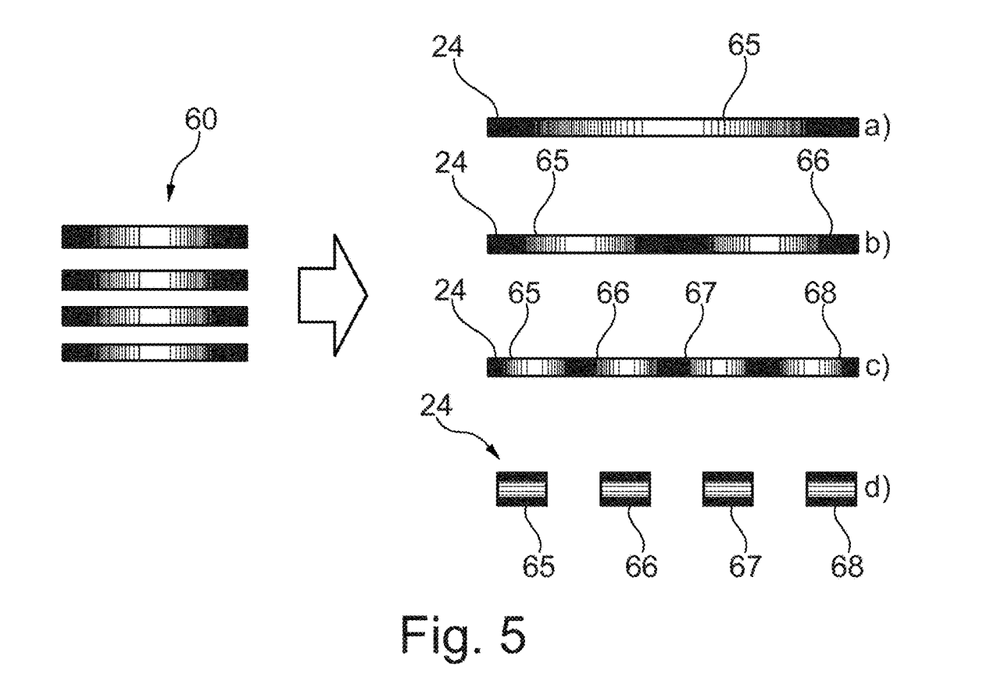
FIG. 5 shows possible distributions of the optical information on a line sensor in the case of a spectrally resolving multi-spot scanning microscope.

A fundamental task in multi-spot scanning microscopy is to detect the spectra 65, 66, 67, 68 as effectively as possible. To this end, in particular GaAsP detectors are available, which are substantially available only in the form of line detectors. It is therefore the object to image these spectra onto one and the same line detector. FIG. 5 shows a plurality of variants of how this can be accomplished. FIG. 5a shows imaging of a single spectrum 65 onto a line detector 24. FIG. 5b shows imaging of two spectra 65, 66 onto the line detector 24, and FIG. 5c shows imaging of all four spectra 65, 66, 67, 68, in mutually adjoining fashion, onto the line detector 24. FIG. 5d shows a special case. Here, the spectra 65, 66, 67, 68 have in each case been rotated by 90° and are all guided onto the line detector 24. Due to the rotation about 90°, and since the line detector 24 in FIG. 5d is spatially resolving only in the horizontal direction but not in the direction that is perpendicular thereto, the spectral resolution is lost in the situation shown in FIG. 5d. This may very well be desirable, for example if the aim is to detect light, in each case in spectrally integrated fashion, that has been transmitted back from a greater number of illumination spots.

The situations of FIGS. 5a to 5d will be considered again below in connection with FIGS. 6 to 9 and 12 to 15.

FIGS. 6 to 9 in each case show rotated luminous fields 63, which are subsequently imaged onto the line detector 24 using the cylindrical optical unit 20 and possibly further optical components. The effect of the cylindrical optical unit 20 and any further optical components present is schematically illustrated in FIGS. 6 to 9 by way of the arrow 25 which points to the right.

Figure 6:
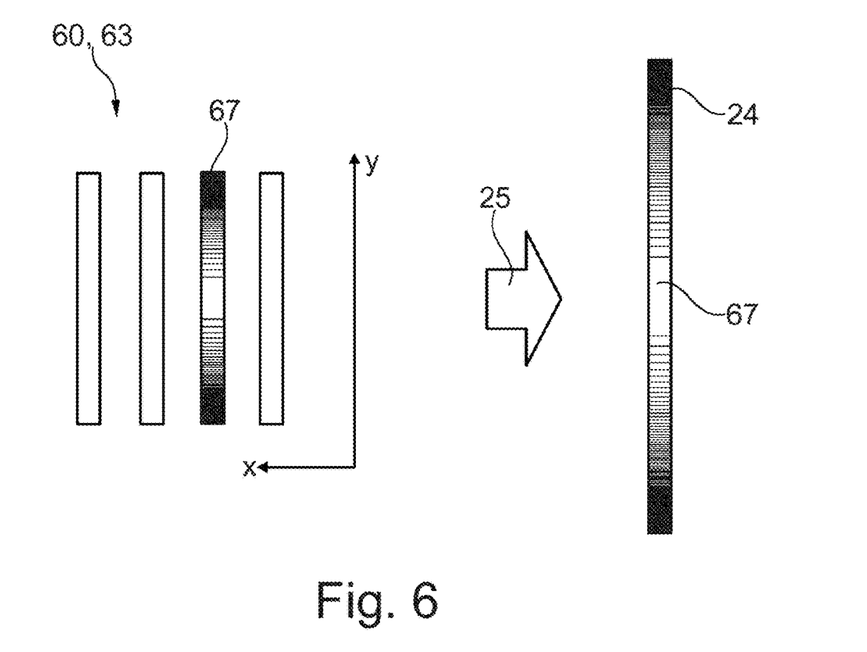
FIG. 6 shows a diagram for explaining the imaging of a spectrum which is associated with a focal point onto a line sensor in a first rotation position of an optical arrangement according to the invention.

FIG. 6 initially shows that the different spectra of the luminous field 60, of which FIG. 6 shows only the spectrum 67, are located one behind the other in the x-direction and extend in the y-direction. In the situation illustrated in FIG. 6, an optical arrangement according to the invention is used to image a single spectrum 67 of an illumination spot onto the line detector 24.

Figure 7:
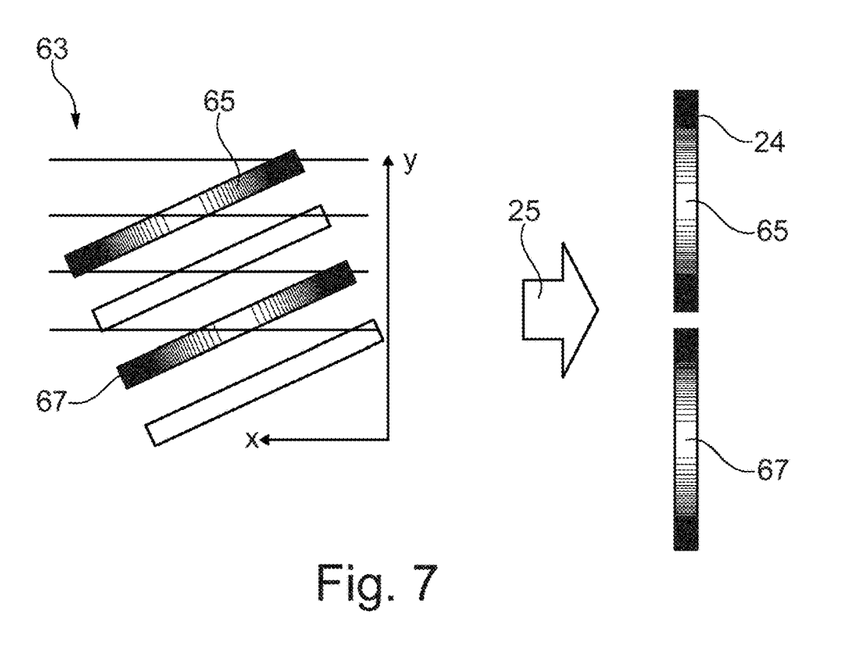
FIG. 7 shows a diagram for explaining the imaging of the spectra of two focal points onto a line sensor in a second rotation position of an optical arrangement according to the invention.

By comparison, in the situation shown in FIG. 7, which corresponds to FIG. 5b, two spectra 65, 67 are imaged onto the line detector 24 in mutually adjoining fashion. This is accomplished by way of the luminous field 63, as is described above in connection with FIG. 1, being rotated with respect to the luminous field 60 that exits the dispersive device 10. The angle of rotation by which the luminous field 60 must be rotated is determined specifically by the distance of the spectra 65, 67 in the luminous field 60 and the extent of the luminous field in the y-direction. If this angle is selected to be too small, the detector 24 will not be optimally utilized. If it is selected to be too large, the spectra 65 and 67 on the detector 24 overlap.

Figure 8:
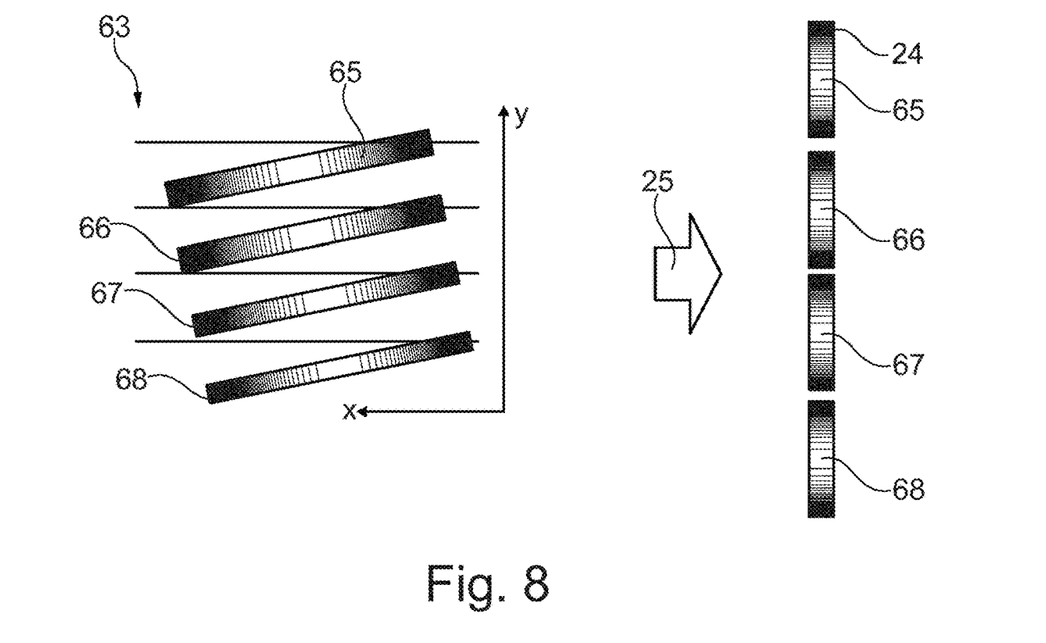
FIG. 8 shows a diagram for explaining the imaging of the spectra of four focal points onto a line sensor in a third rotation position of an optical arrangement according to the invention.

The situation that corresponds to FIG. 5c is illustrated in FIG. 8. Here, the spectra 65, 66, 67, 68 are imaged at the same time onto the line detector 24 such that they adjoin one another. A comparison with FIG. 7 shows that the luminous field here needs to be rotated by a smaller angle because the distance between the two spectra, with the same extent of the spectra in the y-direction, is only half as great.

Figure 9:
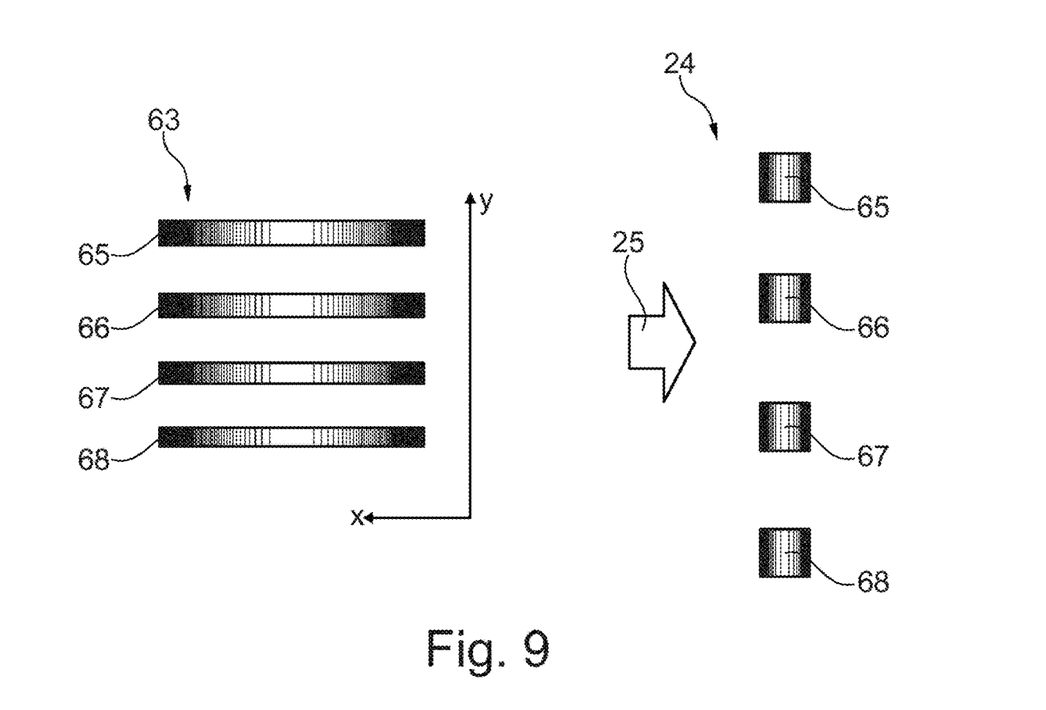
FIG. 9 shows a diagram for explaining the imaging of the detection light of four focal points onto a line sensor for non-spectrally-resolving detection in a fourth rotation position of an optical arrangement according to the invention.

Finally, FIG. 9 shows the situation corresponding to FIG. 5d, in which the luminous field 63 is rotated by the rotation device 30 (see FIG. 1) by 90° with respect to the luminous field 60 that is incident on the rotation device 30. The light from all spectra 65, 66, 67, 68 is imaged here onto the line detector 24, although the spectral resolution is lost. This operating mode may be desirable if the detection light of a large number of illumination spots is to be measured at the same time.

Figure 10:
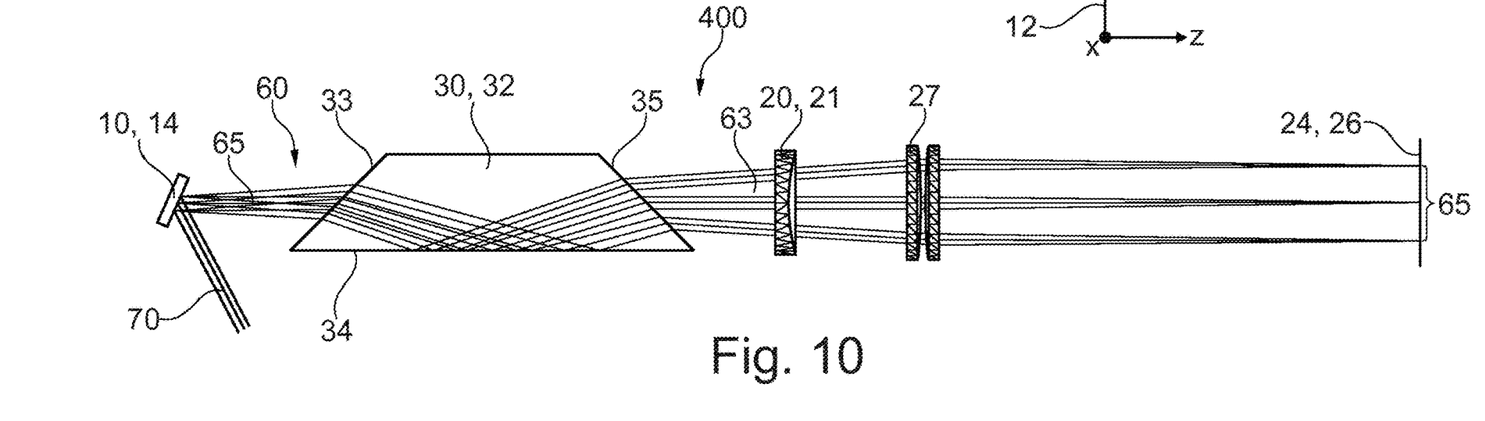
FIG. 10 shows a third exemplary embodiment of an optical arrangement according to the invention in a first rotation position.

A third embodiment variant of an optical arrangement 400 according to the invention is described with reference to FIGS. 10 and 11. It contains a reflective diffraction grating 14 as the dispersive device 10. The incident detection light 70 is spectrally separated in the paper plane (yz-plane) by way of said diffraction grating 14. The luminous field 60 which is thus obtained is incident on an entrance side 33 of a rotatable Dove prism 32, which realizes the rotation device 30 in the variant from FIG. 10. After reflection at a reflection surface 34 of the Dove prism 32, a rotated luminous field 63 exits the Dove prism 32 on an exit side 35. The angle by which the luminous field 63 exiting the Dove prism 32 is rotated as compared to the incoming luminous field 60, here depends on the rotation position of the Dove prism 32 about an axis located horizontally in the paper plane in FIG. 10. The rotation axis of the Dove prism 32 is parallel to the z-direction. The rotation angle by which the luminous field 63 is rotated compared to the luminous field 60 is here, due to the reflection of the luminous field at the reflection surface 34, twice as large as the angle by which the Dove prism 32 is rotated with respect to the position in which the luminous field 60 passes through the Dove prism 32 unchanged. In the situation shown in FIG. 10, the Dove prism 32 is situated in this neutral position, that is to say that the luminous field 63 in FIG. 10 is not rotated as compared to the luminous field 60 that is incident on the Dove prism 32.

Figure 11:
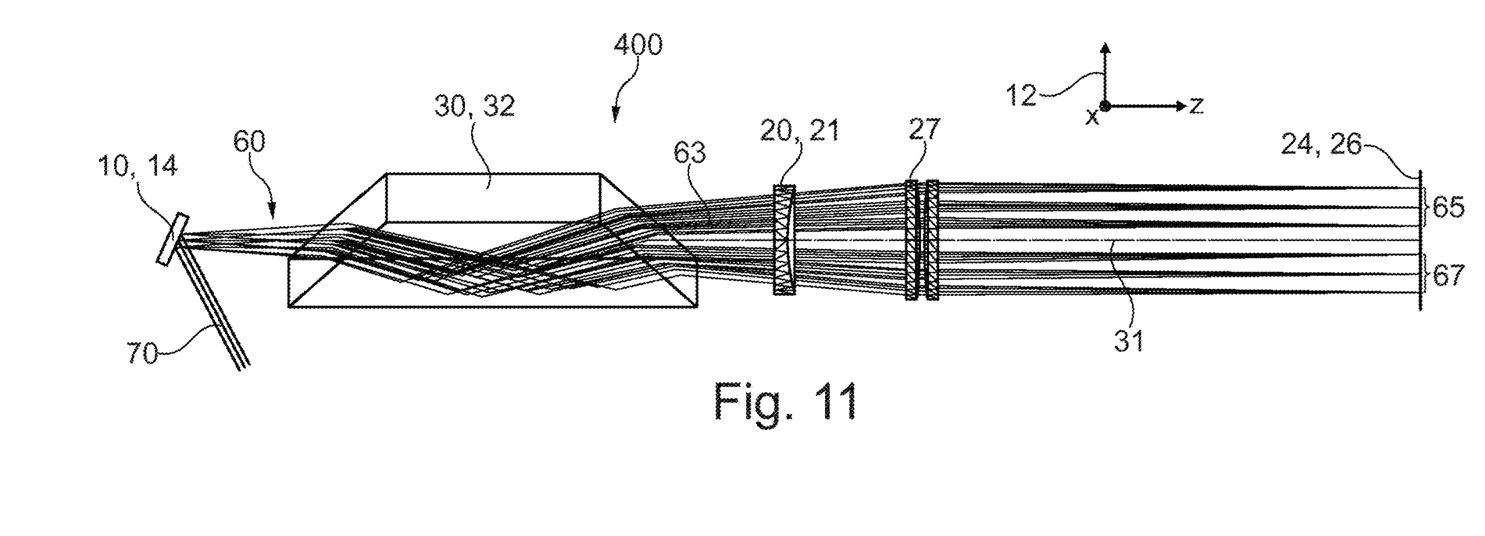
FIG. 11 shows the exemplary embodiment of FIG. 10 in a second rotation position.

By contrast, in the situation shown in FIG. 11, the Dove prism 32 is rotated about the rotational axis that is parallel to the z-direction. The rotation axis is illustrated in FIG. 11 by way of a dotted horizontal line 31. The luminous field 63 is incident in each case on the cylindrical optical unit 20, which is a single cylindrical lens 21 in the variant shown in FIGS. 10 and 11. Focusing of the cylindrical lens 21 is effected here in a direction perpendicular to the paper plane, that is to say in the x-direction, whereas, as is apparent, no focusing by way of the cylindrical optical unit 20 occurs in the paper plane. The light exiting the cylindrical optical unit 20 is subsequently imaged into the detection plane 26, in which a line detector (not shown in FIGS. 10 and 11) can be arranged, using a rotationally symmetric double lens 27. The line detector must be positioned in the detection plane such that it is located in the focal line of the optical arrangement that is made up of the cylindrical optical unit 20 and the double lens 27. The situation illustrated in FIG. 10 corresponds to the situation of FIGS. 5a and 6, that is to say a single spectrum 65 is imaged onto the line detector. The further spectra in FIG. 10 are located in front of or behind the paper plane. It would also be possible in principle to use a two-dimensionally extended and resolving detector. However, since such detectors are currently not available with the desired speed properties, the use of the invention can be beneficial. In the situation illustrated in FIG. 11, as compared to FIGS. 5b and 7, two spectra 65, 67 are imaged, due to the rotation of the luminous field 63 with respect to the luminous field 60, at the same time in the same plane (the paper plane in FIG. 11) into the detection plane 26 such that they adjoin one another.

A further variant of an optical arrangement 500 according to the invention will be explained in connection with FIGS. 12 to 15 in different operating settings. The optical arrangement 500 according to the invention exhibits similarities to the exemplary embodiment 400 illustrated in FIGS. 10 and 11. The dispersive device is not illustrated in FIGS. 12 to 15. In FIGS. 12 to 15, a telescope section is formed by the rotationally symmetric double lenses 27 and 29. The Dove prism 32 is here positioned in each case at a location of the tightest beam constriction. This location is situated, with respect to the beam path of a microscope (not illustrated in FIGS. 12 to 15), in a pupil plane 36. In each case on the left-hand side of FIGS. 12 to 15, the luminous field 60, which is coming from an intermediate image plane 38, enters the optical arrangement 500 according to the invention. The spectrum 65, originating from a first illumination spot, is located here in the paper plane (yz-plane). Further spectra 66, 67, 68, which originate from further illumination spots, are located behind the paper plane (that is to say displaced in the x-direction, see coordinate system 12).

Figure 12:
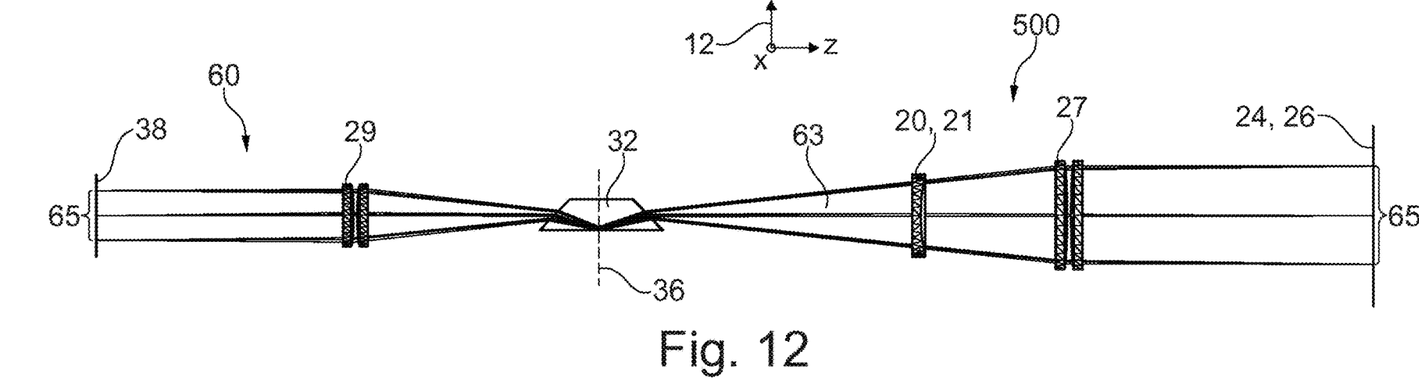
FIG. 12 shows a fourth exemplary embodiment of an optical arrangement according to the invention in a first rotation position.
Figure 13:
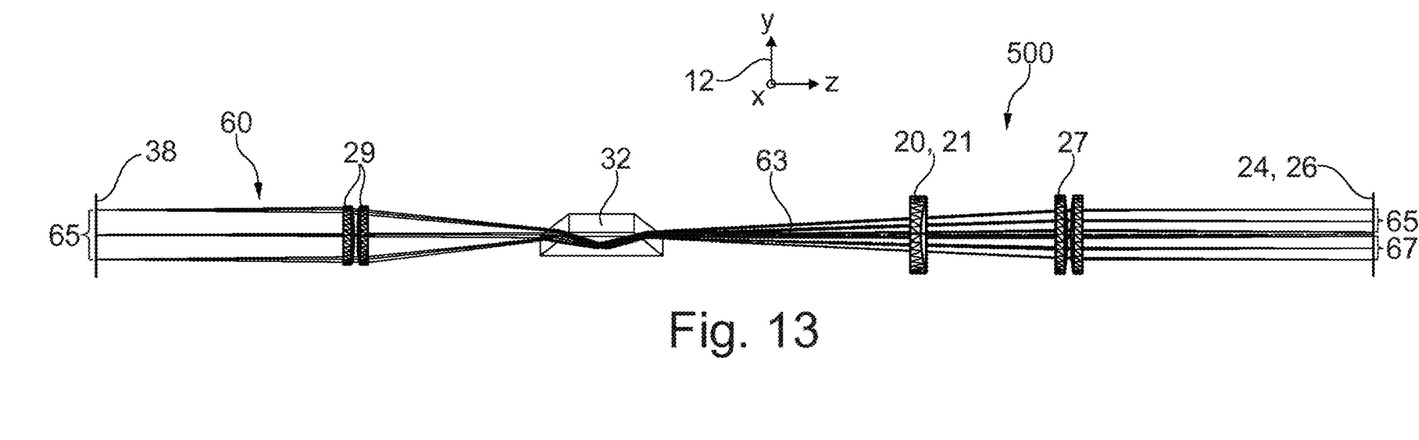
FIG. 13 shows the fourth exemplary embodiment in a second rotation position.
Figure 14:
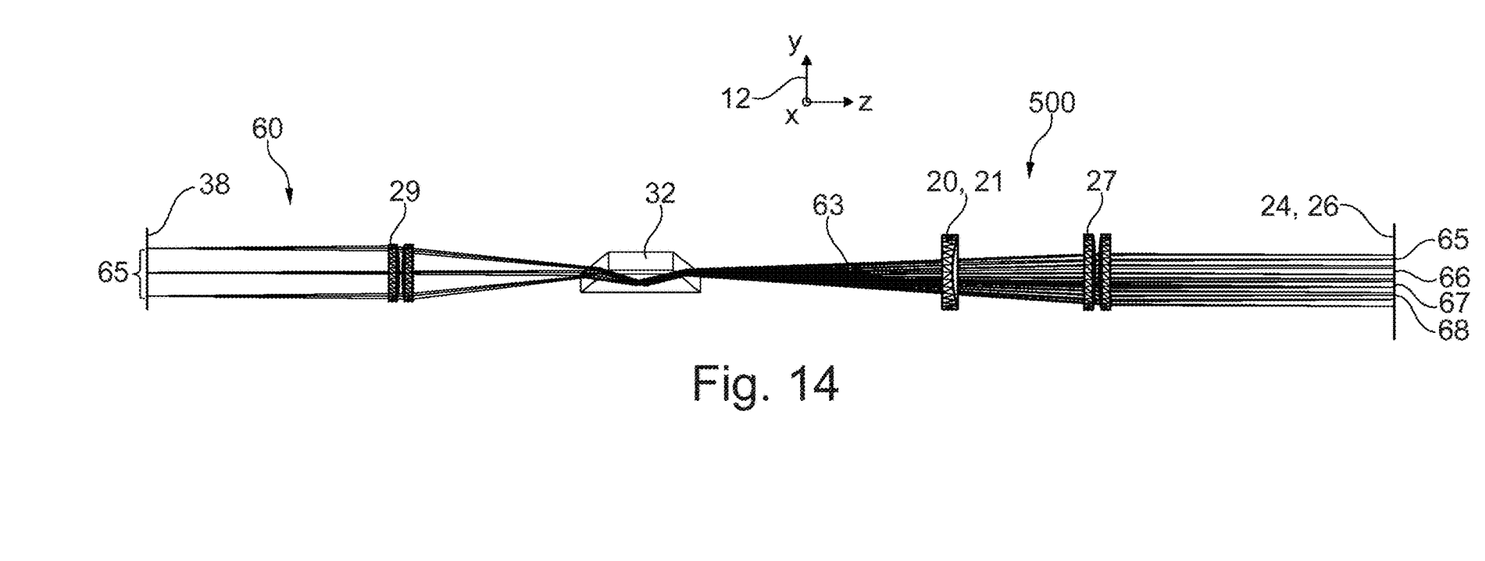
FIG. 14 shows the fourth exemplary embodiment in a third rotation position.
Figure 15:
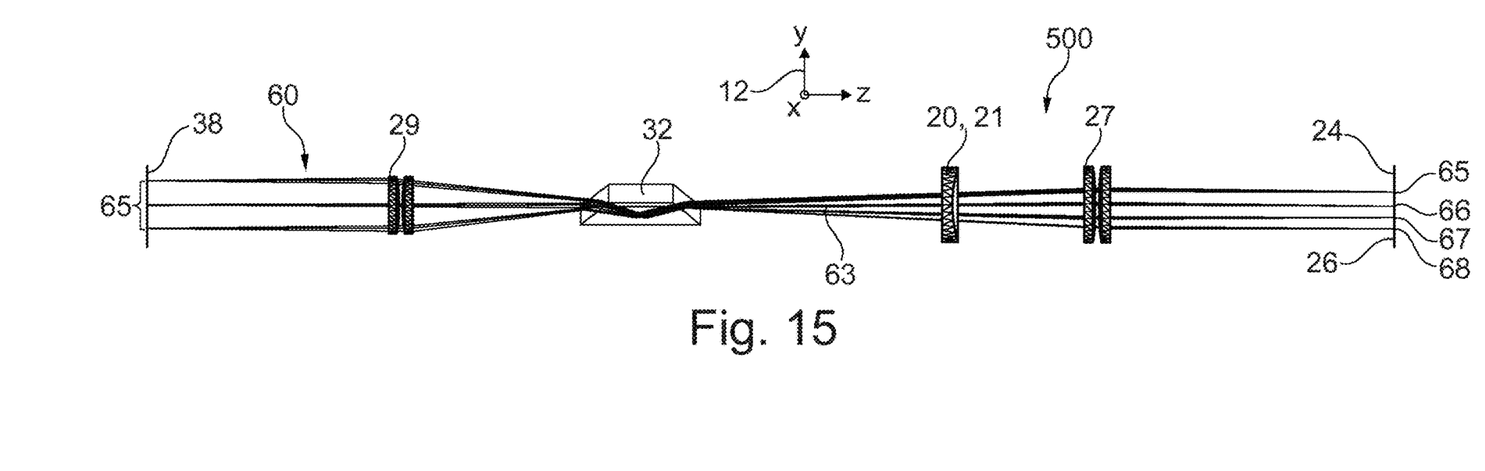
FIG. 15 shows the fourth exemplary embodiment in a fourth rotation position.

The luminous field 60 arrives on the Dove prism 32 via the double lens 29. The luminous field 60 is rotated by the Dove prism 32 about a rotation axis that is parallel to the z-axis (see coordinate system 12 in FIGS. 12 to 15), and the rotated luminous field 63 exits the Dove prism 32. In FIG. 12, the Dove prism 32 is positioned such that the angle of rotation is 0°, that is to say the luminous field 60 is not rotated at all. In the situations shown in FIGS. 13 to 15, the Dove prism 32 is respectively rotated by different angles, which in each case brings about different rotations of the luminous field 63 as compared to the incident luminous field 60. Due to the effect of the cylindrical optical unit 20, the two spectra 65 and 67 are imaged successively onto the line detector 24 in FIG. 13, similar to FIG. 7. In FIG. 14, similar to FIG. 8, all four spectra 65, 66, 67, 68 are imaged successively onto the line detector 24. Finally, in FIG. 15, the luminous field 60 is rotated by 90° by the Dove prism 32, as in FIG. 9, with the result that the light from all four spectra reaches the line detector 24, but is detected hereby in spectrally integrated fashion due to the rotation by 90°.

LIST OF REFERENCE SIGNS

10 Dispersive device
12 Coordinate system
14 Diffraction grating
20 Distortion optical unit, cylindrical optical unit
21 Cylindrical lens
22 Axis of distortion optical unit 20
24 Line detector
25 Arrow
26 Detection plane
27 Double lens
29 Double lens, forming telescope with double lens 27
30 Rotation device
32 Dove prism
33 Entrance side of Dove prism 32
34 Reflection surface of Dove prism 32
35 Exit side of Dove prism 32
36 Pupil plane
38 Intermediate image plane, optically conjugate to detection plane 26
40 Rotation device
50 Control unit for rotation device
51 Rotation direction
52 Rotation direction
60 Luminous field
61 Detection light transmitted back from a first illumination spot
63 Light incident on the distortion optical unit 20
64 Light propagating from the distortion optical unit 20 to the detection plane 26
65 Spectrum of the detection light that is transmitted back from a first illumination spot
66 Spectrum of the detection light that is transmitted back from a second illumination spot
67 Spectrum of the detection light that is transmitted back from a third illumination spot
68 Spectrum of the detection light that is transmitted back from a fourth illumination spot
70 Detection light guided to the optical arrangement 400 according to the invention
100 Optical arrangement according to the invention
200 Optical arrangement according to the invention
300 Multi-spot scanning microscope according to the invention
310 Microscope optical unit
312 Sample plane
316 Excitation light incident on sample 314
318 Detection light emitted by the sample 314
320 Light source module
322 Excitation light
324 Detection beam path, detection light guided to the optical arrangement 100 according to the invention
330 Control unit
332 Measurement data provided by detector 24, connecting line from optical arrangement 100 to control unit 330
334 Actuation line from control unit 330 to optical arrangement 100 according to the invention
400 Optical arrangement according to the invention

The invention claimed is:

1. An optical arrangement, in particular for the detection beam path of a multi-spot scanning microscope, the optical arrangement comprising:
    a detection plane, in which a detector is positionable,
    a dispersive device for spectrally separating detection light,
    a distortion optical unit for guiding the detection light into the detection plane, said distortion optical unit being arranged, in the beam direction, downstream of the dispersive device and upstream of the detection plane,
    a rotation device for the relative rotation of a luminous field of the spectrally separated detection light and the distortion optical unit, and
    a telescope optical unit with a first and a second lens for adapting an imaging scale to dimensions of a detector that is used, wherein the distortion optical unit and the rotation device, are arranged between the first and the second lens of the telescope optical unit.

2. A multi-spot scanning microscope, comprising:
    a microscope optical unit,
    an illumination beam path,
    a detection beam path,
    a light source for providing excitation light in the illumination beam path,
    a scanner,
    an optical arrangement in the detection beam path, the optical arrangement including:
        a detection plane, in which a detector is positionable,
        a dispersive device for spectrally separating detection light,
        a distortion optical unit for guiding the detection light into the detection plane, said distortion optical unit being arranged, in the beam direction, downstream of the dispersive device and upstream of the detection plane, and
        a rotation device for the relative rotation of a luminous field of the spectrally separated detection light and the distortion optical unit,
    a detector positioned in the detection plane of the optical arrangement, wherein the detector plane of the optical arrangement is optically conjugate to a sample plane, and
    a control unit for actuating the optical arrangement and the light source and for at least provisionally processing measurement data provided by the detector.

3. The multi-spot scanning microscope as claimed in claim 2,
wherein
the distortion optical unit includes at least one of a refractive anamorphic optical unit, a reflective anamorphic optical unit, a refractive cylindrical optical unit, or a reflective cylindrical optical unit.

4. The multi-spot scanning microscope as claimed in claim 2,
wherein
the distortion optical unit includes a fixed or variable diffraction optical unit.

5. The multi-spot scanning microscope as claimed in claim 2,
wherein
the detector is arranged in the detection plane.

6. The multi-spot scanning microscope as claimed in claim 5,
wherein
the detector is a line detector and
a longitudinal direction of the line detector extends parallel to an axis of the distortion optical unit.

7. The multi-spot scanning microscope as claimed in claim 5,
wherein
the detector is a GaAsP detector, a photomultiplier, a SPAD array, or a fast camera.

8. The multi-spot scanning microscope as claimed in claim 2,
wherein
the distortion optical unit is fixed relative to the dispersive device.

9. The multi-spot scanning microscope as claimed in claim 2,
wherein
the distortion optical unit is rotatable relative to the dispersive device with the rotation device.

10. The multi-spot scanning microscope as claimed in claim 2,
wherein
the rotation device includes at least one rotation mirror.

11. The multi-spot scanning microscope as claimed in claim 2,
wherein
the rotation device includes at least one rotation prism.

12. The multi-spot scanning microscope as claimed in claim 11,
wherein
the rotation prism is arranged at a location of a tightest constriction of the detection beam path.

13. The multi-spot scanning microscope as claimed in claim 11,
wherein
the rotation prism is an Abbe-Koenig prism or a Dove prism.

14. The multi-spot scanning microscope as claimed in claim 2,
wherein
a refractive component or a diffractive component is present as the dispersive device.

15. The multi-spot scanning microscope as claimed in claim 2,
wherein
a prism or a diffractive grating is present as the dispersive device.

16. The multi-spot scanning microscope as claimed in claim 2,
wherein
the cylindrical optical unit is formed by a single cylindrical lens.

17. The multi-spot scanning microscope as claimed in claim 2,
wherein
the optical arrangement further includes a telescope optical unit with a first and a second lens for adapting an imaging scale to dimensions of the detector, wherein the distortion optical unit and the rotation device, are arranged between the first and the second lens of the telescope optical unit.

18. The multi-spot scanning microscope as claimed in claim 2,
wherein
the optical arrangement further includes a zoom optical unit for adapting an imaging scale to dimensions of the detector.

19. The multi-spot scanning microscope as claimed in claim 2,
wherein
an axis of the relative rotation between the distortion optical unit and the luminous field is oriented perpendicularly to an axis of the distortion optical unit.

20. A method for operating a microscope as claimed in claim 2, in which the rotation device is used to set a rotation position of the luminous field relative to the distortion optical unit in dependence on a number of illumination spots.

21. The method as claimed in claim 20,
wherein
the optical arrangement is used to image, depending on the position of the rotation device, the spectrum of one illumination spot, the spectra of two illumination spots, or the spectra of four illumination spots onto the detector.

* * * * *

UNITED STATES PATENT AND TRADEMARK OFFICE
CERTIFICATE OF CORRECTION

| | |
|---|---|
| PATENT NO. | : 11,531,193 B2 |
| APPLICATION NO. | : 16/344164 |
| DATED | : December 20, 2022 |
| INVENTOR(S) | : Matthias Wald, Tiemo Anhut and Daniel Schwedt |

It is certified that error appears in the above-identified patent and that said Letters Patent is hereby corrected as shown below:

On the Title Page

Item (72), Inventors, "Tierno Anhut" should read "Tiemo Anhut".

Signed and Sealed this
Twenty-first Day of March, 2023

Katherine Kelly Vidal
*Director of the United States Patent and Trademark Office*